United States Patent [19]

Rumpel

[11] 4,381,054
[45] Apr. 26, 1983

[54] MULTIDIRECTIONAL BOARD SUPPORT

[75] Inventor: Donald D. Rumpel, Kellogg, Id.

[73] Assignee: Henwebcor, Incorporated, Colfax, Wash.

[21] Appl. No.: 223,936

[22] Filed: Jan. 9, 1981

[51] Int. Cl.³ .............................................. B65G 13/00
[52] U.S. Cl. ............................................... 193/35 MD
[58] Field of Search ................ 193/35 R, 35 MD, 42; 308/202, 6 R, 200, 194, 184, 189 R

[56] References Cited

U.S. PATENT DOCUMENTS

| | | | |
|---|---|---|---|
| 1,251,881 | 1/1918 | Goodwin | 193/35 R |
| 1,963,956 | 6/1934 | Craig | 193/35 MD |
| 2,818,092 | 12/1957 | Grosset | 193/42 |
| 2,949,992 | 8/1960 | Weinberg | 193/35 MD |
| 3,559,802 | 2/1971 | Eidus | 308/6 R X |
| 4,039,064 | 8/1977 | Kirby | 193/42 |
| 4,060,252 | 11/1977 | Mowery | 193/35 MD X |

Primary Examiner—John J. Love
Assistant Examiner—Gene A. Church
Attorney, Agent, or Firm—Wells, St. John & Roberts

[57] ABSTRACT

A board support is described that can be mounted to support a board for free multidirectional movement in relation to a woodworking machine or tool such as a saw. The support includes a plurality of spherical rollers cradled by narrow, upright ribs on a base. The base, ribs and portions of the rollers are enclosed within a removable cover. The rollers project through holes in the cover that are positioned so their circular peripheries will not touch the rollers.

9 Claims, 7 Drawing Figures

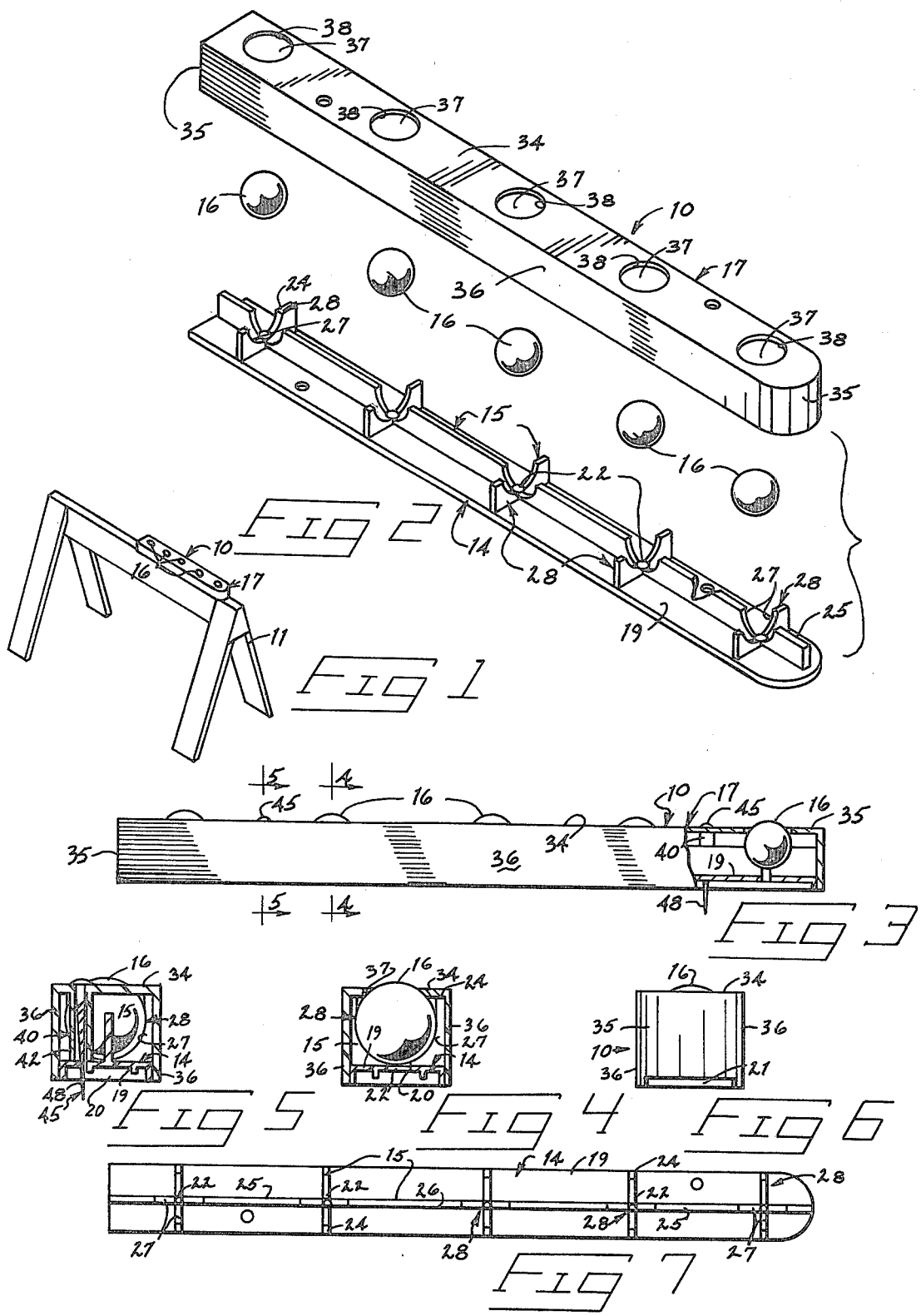

MULTIDIRECTIONAL BOARD SUPPORT

BACKGROUND OF THE INVENTION

The present invention is related to supports for movably holding a board or other workpiece and more particularly to such supports that will allow multidirectional motion of the board.

Floor-supported woodworking tools typically include a workpiece support "table" and a stationary "fence" or guide that is used to direct boards in a defined path past a woodworking station. Practicality and space requirements dictate the dimension of the guide and support table, which is typically too small for handling large workpieces. Additional support is required for accurate, safe work, with long boards or large workpieces such as plywood.

Various auxiliary supports for large or elongated workpieces have been designed in the past. An example of a portable support of this nature is disclosed in U.S. Pat. No. 4,039,064 to R. Kirby. The Kirby support can be moved easily from one work area to another and can be easily adjusted to various working heights. However, the unit will operate only while under certain working conditions—when the workpiece is to be moved in a direction perpendicular to the roller axis. The roller will rotate beneath the workpiece but will slide frictionally when the direction of the workpiece movement is other than perpendicular to the roller axis. In circumstances such as during board ripping operations, this feature is desirable. However, there remains a need for an inexpensive universal type support that will allow motion of a board or a workpiece in a variety of directions.

U.S. Pat. No. 2,818,092 to L. E. Grosset discloses a universal work support in which a plurality of "caster wheels" are mounted along a bar and held on an adjustable stand with the wheels inverted and projecting upwardly. The caster wheels allow a certain "universal" motion of the workpiece but can also cause light shifting of the workpiece when the casters pivot about the axes of their mounting shafts. Such slight motion could result in an inaccurate pass of the workpiece and, furthermore, could result in binding between the workpiece and the associated machine.

U.S. Pat. No. 1,251,881 to W. N. Goodwin describes a skid that uses spherical rollers in place of casters. The rollers project beyond a race to engage the workpiece. The race is formed in two halves, each having a semispherical recess for journalling a roller. Only a small portion of each roller projects beyond the race. The remainder of the roller periphery is engaged by the race. Accumulation of dust or other foreign material between the rollers and race could therefore hamper free rotation of the rollers. Frequent cleaning would become necessary and each roller must then be removed so each recess could be cleaned separately. The process could become more complicated when several rollers are involved.

Other U.S. patents, specifically U.S. Pat. Nos. 4,060,252; 3,559,802; and 1,963,596 all disclose "transfer" apparatus using semispherical or similar roller receiving recesses for journalling spherical rollers. These disclosures therefore show the same cleanout problem that would be experienced with the Goodwin device if used as a multidirectional board support.

The present invention makes use of a base having upright intersecting ribs that include semicyclindrical recesses at the intersections thereof. Spaces between the intersecting ribs allow dust and debris to fall free of the rollers. This material can then be periodically removed without requiring removal of the rollers from their cradles. There are no "sockets" that must be individually cleaned after removal of the associated roller. The base and rollers are selectively covered primarily to prevent escape of the rollers from their cradles and secondarily to avoid accumulation of debris, since cleanout may be accomplished quickly and effectively.

BRIEF DESCRIPTION OF THE DRAWINGS

A preferred form of the present invention is illustrated in the accompanying drawings in which:

FIG. 1 is a pictorial view showing the present invention mounted to a "sawhorse";

FIG. 2 is an exploded pictorial view of the present support;

FIG. 3 is a fragmentary elevation view thereof;

FIG. 4 is an enlarged sectional view taken on line 4—4 in FIG. 3;

FIG. 5 is an enlarged sectional view taken on line 5—5 in FIG. 3;

FIG. 6 is an enlarged end view as seen from the left in FIG. 3; and

FIG. 7 is a plan view of the base for the present support.

DETAILED DESCRIPTION OF A PREFERRED EMBODIMENT

A preferred form of the present multidirectional board support is indicated in the accompanying drawings by the reference number 10. The present support 10 is provided to movably support an elongated workpiece such as a board (not shown) for movement preferably in a planar direction toward or away from a stationary tool such as a saw (also not shown). The present support 10 can itself be supported on any convenient structure such as the sawhorse shown in FIG. 1 at 11. Other supportive structure, such as an ordinary shelf bracket and upright standard, can be used to hold the present support at a desired elevation and in a horizontal orientation.

The structure of the present multidirectional board support 10 is shown more completely in FIGS. 2 through 7. As shown, the support 10 basically includes an elongated base 14 on which a number of intersecting upright ribs 15 are mounted. The ribs are indented to receive a number of spherical rollers 16. The rollers freely rotate at the intersections of the ribs. The base 14, ribs 15, and rollers 16 are at least partially enclosed within a cover 17 which is used to retain the rollers in position and to prevent excessive buildup of debris along the base.

The base 14 is shown in particular detail in FIGS. 2 and 4 through 7. The base includes an elongated horizontal plate 19 that mounts the upright ribs 15. The plate 19 includes a longitudinal downwardly facing cleanout groove 20 on the underside thereof. This groove 20 leads to one end of the base which includes a rear opening 21 (FIG. 6).

A number of cleanout holes 22 extend through plate 19. The cleanout holes 22 coincide with the intersections of the ribs 15. Holes 22 are provided to receive and direct debris such as dust particles, etc. downwardly clear of the base and ribs and into the cleanout groove 20. The rear opening 21 allows escape of material received through the holes 22.

The ribs 15 are mounted to the base 14. Preferably, the ribs are formed integrally with the base and of the same material. Each rib 15 includes parallel upright side walls 26 that lead to top edges 24 (FIG. 4) or 25 (FIG. 5). Edges 24 are spaced above the base plate 19 by a distance slightly greater than the remaining top edges 25. This height relationship is a feature that will be discussed in further detail below.

Each of the ribs 15 includes a semicircular indentation 27. The indentations 27 are situated at the intersections of the several ribs with the centers at or very near the points of intersection. The intersecting indentations therefore form upwardly open semispherical cradles 28 which will slidably receive the spherical rollers 16. It is noted that the indentations do not close over the rollers. Their curvature terminates approximately at the roller centers. The rollers can therefore be easily removed from their respective cradles 2 for cleaning or replcement.

It is noted that each cradle 28 is formed with four ribs. One set of ribs runs longitudinally along the length of the base member while the remaining sets are perpendicular thereto. Other arrangements might be envisioned, however, wherein only three ribs per cradle are used. The number of ribs should be three or more for each cradle.

It is preferred that each of the ribs have a thickness between upright side walls 26 that is substantially less than the diameter of the rollers. In fact, it is desirable to make use of ribs that are relatively thin and spaced to produce open, angular gaps along the roller peripheries between adjacent ribs. The rib edges intersecting the roller therefore can then act as wipers, cleaning off the rollers as they roll in their cradles. Material cleaned from the rollers falls onto the plate 19 or through the holes 22 clear of the rollers. The rollers will therefore remain freely rotatable within their respective cradles 28.

The cover 17 is similar in configuration to the elongated base 14. Cover 17 fits over the base 14 to cover the rollers 16 partially and to cover the ribs 15 and base plate 19. To this end, the cover 17 includes a horizontal top surface 34 extending between opposed ends 35. The top surface 34 also includes parallel upright side walls 36 defining an opening along their bottom edges that is complementary to the configuration of the base.

The top cover surface 34 includes a number of openings 37. The openings 37 are circular and are separated along the top surface by spaces corresponding to the spacing of the cradles 28. A portion of each roller 16 projects outwardly through the associated opening. Each of the openings 37 also includes a diameter that is less than the maximum diameter of an associated roller so the roller cannot escape through the opening.

A spacer means 40 is provided between the base and cover for releasably mounting the cover to the base in a spaced relation so a portion of each roller will project through a corresponding opening 37. The spacer means 40 is positioned to allow the rollers 16 to project through the openings without touching the opening peripheries 38 (FIG. 2). Therefore a small circular gap is found between the opening peripheries 38 and the corresponding surfaces of the rollers 16 (see FIG. 4).

The spacer means 40 may include upright fingers 42 that project downwardly from the cover to abut with the base 14 (FIGS. 3 and 5). The fingers 42 space the top surface 34 of the cover precisely in relation to the rollers 16 so the opening peripheries will not engage the rollers. The fingers 42 can be assisted by the top rib edges 24. Edges 24, as briefly discussed above, project a distance above the rib edges 25. The edges 24 will therefore abut the underside of the cover top 34, spacing it in relation to the base 14. It is noted that the fingers 42 can be used alone as the spacing means, or the rib top surfaces 24. Preferably, however, both are used to hold the cover and base securely in the exact desired positions.

A mounting means is provided at 45 for attachment of the support 10 to a horizontal surface such as the sawhorse shown in FIG. 1. The mounting means 45 may be incorporated with the spacer means 40 as shown in FIGS. 3 and 5 wherein the fingers 42 are provided with downwardly open bores. The bores each receive a mounting screw 48 that can be used to attach the assembly to the desired support 11. The screws also serve to secure the cover and base together.

Before operating the present invention, assembly is accomplished by securing the present support 10 to a horizontal surface at an elevation substantially equal to that of the associated woodworking tool. A board or other elongated workpiece can then be placed on the exposed roller surfaces. The rollers then support the board for free movement in any direction at the desired horizontal elevation on the rollers. The individual rollers will rotate freely within their respective cradles 28 as the board is moved.

A typical use for the present support is to provide multi-directional movable support for a board in relation to a saw. The support can be used to one side of a saw for holding a board during a "cross cut" operation or can be situated at one end of the saw for supporting a board during a "ripping" operation. The rollers will allow free board movement in either direction; longitudinal or transverse to its length.

It is well understood that waste material such as sawdust and other debris will drop from the board or otherwise be collected on the surface of the rollers. This material will eventually come into engagement with the edges of the ribs as the rollers rotate. These edges will wipe the material from the peripheries of the rollers and allow it to drop clear of the rollers, either onto the base or through the cleanout holes 22. This material may build up over an extended period. Therefore, cleaning of the present support can be accomplished simply by lifting the cover and using air pressure to blow the accumulation from the base, ribs, and cover. None of the rollers need be removed from this process unless the cleanout groove 20 is to be cleaned. Then, it is necessary that only one ball be removed to provide access to the associated cleanout hole 22. The remaining rollers can remain in place. It is also noted, however, that any of the rollers can be simply and easily removed and replaced due to the open configuration of the cradles 28 and arrangement of the ribs.

It is pointed out that the entire support structure can be constructed of an inexpensive, noncorrosive material. Preferably, the support, including the rollers, can be constructed entirely of plastic. It is preferred that the rollers be constructed of polyethylene or similar material. The nature of the plastic rollers, cover and base, will not encourage rust or corrosion and provides an inherent lubrication feature between the ribs and rollers due to the relatively low coefficient of friction between the materials.

Having thus described my invention, what I claim is:

1. A multi-directional board support comprising:
an elongated base;
intersecting upright ribs on the base, having semicircular indentations centered at the points of intersection of the ribs, forming semi-spherical cradles;
cleanout holes formed through the base at the points of intersection of the ribs;
a spherical roller for each of the semi-spherical cradles, releasably receivable in said cradle for free rotation therein about its center;
a cover releasably received over the base and rollers, having circular openings formed therein corresponding with the respective cradles with each opening having a circular periphery with a diameter less than that of the rollers;
means for releasably mounting the cover to the base with a portion of each roller projecting through a corresponding circular cover opening without the periphery of the opening engaging the roller, to enable the roller to freely rotate about its center; and
spacer means between the cover and base for positioning the cover relative to the base to space the openings over the rollers and cover the ribs, with the opening peripheries spaced clear of the rollers and with the rollers projecting through the openings beyond the cover.

2. The board support as claimed in claim 1 wherein the intersecting upright ribs include:
longitudinal rib members extending along the base; and
transverse rib segments intersecting the longitudinal rib members at spaced intervals along the length of said base.

3. The board support as claimed in claim 1 wherein the cover includes a flat top wall having said circular openings formed therein, said top wall being joined along peripheral edges by longitudinal side walls and opposed end walls;
wherein said base is received in the confines of the side and end walls; and
wherein said cover includes spacer means for abutment with the base to space said openings over the rollers without the peripheries of said openings engaging the rollers.

4. The board support as claimed by claim 1 further comprising mounting means on the base for adapting the support for attachment to a horizontal surface such as the horizontal member of a sawhorse.

5. The board support as claimed by claim 1 further comprising a cleanout groove formed along the base and openly communicating with the cleanout holes.

6. The board support as claimed by claim 1 wherein each roller is engaged by the ribs along at least three equiangularly spaced locations about its periphery and wherein the thickness dimension of each rib is such that open gaps are formed along the roller periphery between adjacent ribs.

7. The board supports as claimed by claim 1 wherein a number of said ribs project from the base to engage the cover, to hold the cover at a prescribed distance from the base to position the peripheries of the openings clear of the rollers and with the rollers projecting through the openings; and wherein the remaining ribs include top edge surfaces spaced from the cover providing cleanout spaces to avoid accumulation of debris within the cradles.

8. The board support as claimed by claim 1 wherein the ribs are integral with the base and are formed of a synthetic resin, wherein the cover is formed of a synthetic resin and wherein the rollers are formed of polyethylene.

9. A multi-directional board support comprising:
an elongated base;
intersecting upright ribs on the base, having semicircular indentations centered at the points of intersection of the ribs, forming semi-spherical cradles with open angular gaps between adjacent ribs;
cleanout holes formed through the base at the points of intersection of the ribs;
a spherical roller for each of the semi-spherical cradles, releasably receivable in said cradle for free rotation therein about its center;
wherein surfaces of the ribs defining the semicircular indentations are engaged uniformly against the surface of the rollers so that edges of the indentation surfaces will wipe the rollers clean as they are rotated;
a cover releasably received over the base and rollers, having circular openings formed therein corresponding with the respective cradles with each opening having a circular periphery with a diameter less than that of the rollers; and
means for releasably mounting the cover to the base with a portion of each roller projecting through a corresponding circular cover opening without the periphery of the opening engaging the roller, to enable the roller to freely rotate about its center.

* * * * *